(12) United States Patent
Yan et al.

(10) Patent No.: US 12,467,967 B2
(45) Date of Patent: Nov. 11, 2025

(54) DEVICE AND METHOD FOR LIVE DETECTING PARTIAL DISCHARGE OF OVERHEAD LINE IN DISTRIBUTION NETWORK AND EQUIPMENT ALONG LINE

(71) Applicant: XI'AN JIAOTONG UNIVERSITY, Xi'an (CN)

(72) Inventors: Yuan Yan, Xi'an (CN); Hongjie Li, Xi'an (CN); Lei Jin, Xi'an (CN); Yinsong Zhao, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 190 days.

(21) Appl. No.: 18/321,888

(22) Filed: May 23, 2023

(65) Prior Publication Data
US 2023/0384359 A1 Nov. 30, 2023

(30) Foreign Application Priority Data
May 27, 2022 (CN) .......................... 202210584498.5

(51) Int. Cl.
*G01R 31/12* (2020.01)
*G04R 20/04* (2013.01)

(52) U.S. Cl.
CPC ......... *G01R 31/1272* (2013.01); *G04R 20/04* (2013.01)

(58) Field of Classification Search
CPC .... G01R 31/1272; G01R 31/12; G04R 20/04; Y04S 40/124
See application file for complete search history.

(56) References Cited

U.S. PATENT DOCUMENTS

| | | | |
|---|---|---|---|
| 9,948,418 B2* | 4/2018 | Katayama | G01D 18/00 |
| 2011/0251806 A1* | 10/2011 | Klapper | H02J 13/00017 |
| | | | 702/60 |
| 2015/0280903 A1* | 10/2015 | Gross | H04L 7/0008 |
| | | | 375/362 |
| 2020/0319142 A1* | 10/2020 | Kosaka | H02K 15/04 |
| 2021/0325283 A1* | 10/2021 | Tsuji | G01N 3/08 |
| 2023/0194592 A1* | 6/2023 | Pinheiro Martins | |
| | | | G01R 31/1245 |
| | | | 324/551 |

* cited by examiner

*Primary Examiner* — Alvaro E Fortich
(74) *Attorney, Agent, or Firm* — Piloff Passino & Cosenza LLP; Rachel K. Piloff; Sean A. Passino

(57) ABSTRACT

Provided are a device and a method for live detecting a partial discharge of an overhead line in a distribution network and equipment along the line, including: acquiring a second synchronous pulse signal and a first partial discharge signal via a master detection unit; acquiring a first synchronous pulse signal and a second partial discharge signal via a slave detection unit; analyzing the second synchronous pulse signal and the first synchronous pulse signal via a main control computer to obtain time data; and calculating a propagation time based on the time data, synchronously processing the time data based on the propagation time to obtain reference zeros, and calculating a partial discharge location according to the first partial discharge signal and the second partial discharge signal based on the reference zeros.

6 Claims, 13 Drawing Sheets

DEVICE AND METHOD FOR LIVE DETECTING PARTIAL DISCHARGE OF OVERHEAD LINE IN DISTRIBUTION NETWORK AND EQUIPMENT ALONG LINE

CROSS-REFERENCE TO RELATED APPLICATIONS

This disclosure claims priority to Chinese Patent Application No. 202210584498.5, filed on May 27, 2022, the contents of which are hereby incorporated by reference.

TECHNICAL FIELD

The disclosure belongs to the technical field of power equipment condition assessment, and in particular, relates to a device and a method for live detecting a partial discharge of an overhead line in a distribution network and equipment along the line.

BACKGROUND

Overhead lines are widely used in medium-voltage distribution networks in main urban areas, suburbs, and vast rural areas of China. The overhead lines are always laid along roads in cities or in forest-covered areas between farmlands. Friction contacts between the lines and tree branches, aging of insulators, lightning arresters, circuit breakers, and other equipment along the lines, sudden lightning strikes, and other factors may all lead to partial discharges in the overhead lines or equipment along the lines. Partial discharge is a localized dielectric breakdown of a small portion of an electrical insulation system under high voltage stress, in which the breakdown does not completely bridge the space between the two conductors. These discharges may reduce insulation levels of a overhead line system. If these discharges are not removed in time, they may eventually develop into permanent faults, leading to power interruption, and may even cause personal injuries and forest fires.

Nowadays, power grid companies in China frequently use ultrasonic inspection to find partial discharge defects in the overhead lines or the equipment along the lines. Compared with conventional human visual inspection, the ultrasonic inspection has indeed achieved more accurate and efficient maintenance. However, latest ten years' experience reveals some technical problems of the ultrasonic inspection, including low detection efficiency and low sensitivity to internal discharges of the equipment along the lines. During the ultrasonic inspection process, inspectors have to walk along the overhead lines and carry out the ultrasonic inspection on each tower from multiple angles. This process is very time-consuming and labor-intensive, especially when there is no sidewalk in a countryside or a jungle, where the ultrasonic inspection of the partial discharges of the lines is almost impossible. In addition, when partial discharges occur in the equipment along the lines, such as circuit breakers and transformers, a magnitude of ultrasonic signals is sharply attenuated at interfaces from solid media to gas media, resulting in low ultrasonic detection sensitivity and frequent missed detections. Given these problems, power companies have been looking for more efficient and smart solutions. Some researchers have proposed that unmanned aerial vehicles (UAVs) may be equipped with ultrasonic detection devices to inspect the overhead lines. However, the sensitivity of ultrasonic detection has been seriously influenced by the rotor noise interference of the UAVs, making this technique not further applied for detecting partial discharge in overhead line systems. Given the above industrial application status, how to improve the efficiency and expand the coverage of partial discharge detection for the medium-voltage overhead line system is an important issue concerned by relevant technical departments and the power enterprises in the condition assessment of the overhead lines in distribution networks.

SUMMARY

An objective of the disclosure is to provide a device and a method for live detecting a partial discharge of an overhead line in a distribution network and equipment along the line, to solve problems existing in the state-of-the-art solutions.

In order to achieve the above objective, on the one hand, the disclosure provides a device for live detecting partial discharge activities in medium-voltage overhead line systems, including:

a master detection unit, a slave detection unit, and a main control computer, where the master detection unit and the slave detection unit are respectively connected with the main control computer.

The master detection unit performs clock calibration based on a clock calibration instruction, sends a first synchronous pulse signal and receives a second synchronous pulse signal after the clock calibration, and acquires first partial discharge information based on an acquisition time instruction.

The slave detection unit performs clock calibration based on the clock calibration instruction, receives the first synchronous pulse signal and sends the second synchronous pulse signal after the clock calibration, and acquires second partial discharge information based on the acquisition time instruction.

The main control computer sends the clock calibration instruction, sends the acquisition time instruction after receiving the first synchronous pulse signal and the second synchronous pulse signal, receives the first partial discharge information and the second partial discharge information after sending the acquisition time instruction, performs clock synchronization based on the first synchronous pulse signal and the second synchronous pulse signal, and calculates a partial discharge location according to the first partial discharge information and the second partial discharge information based on a clock synchronization result.

Optionally, the master detection unit includes:

a master synchronous pulse transmitting module, master partial discharge sensor modules, master insulating handles, master communication optical fibers, and a master detection host. The master synchronous pulse transmitting module and the master partial discharge sensor modules are respectively connected with the master detection host through the master communication optical fibers. The master insulating handles are connected with the master synchronous pulse transmitting module and the master partial discharge sensor modules for live erecting the master synchronous pulse transmitting module and the master partial discharge sensor modules on an overhead line.

The master synchronous pulse transmitting module is used for transmitting the first synchronous pulse signal.

The master partial discharge sensor modules are used for receiving the second synchronous pulse signal and the first partial discharge signal.

The master insulating handles are used for live mounting the master partial discharge sensor modules and the master synchronous pulse transmitting module.

The master communication optical fibers are used for transmitting the second synchronous pulse signal and the first partial discharge signal to the master detection host.

The master detection host is used for controlling the master synchronous pulse transmitting module to transmit the first synchronous pulse signal and sending the second synchronous pulse signal and the first partial discharge signal to the main control computer.

Optionally, the slave detection unit includes:
a slave synchronous pulse transmitting module, slave partial discharge sensor modules, slave insulating handles, slave communication optical fibers, and a slave detection host. The slave synchronous pulse transmitting module and the slave partial discharge sensor modules are respectively connected with the slave detection host through the slave communication optical fibers. The slave insulating handles are connected with the slave synchronous pulse transmitting module and the slave partial discharge sensor modules for live erecting the slave synchronous pulse transmitting module and the slave partial discharge sensor modules on the overhead line.

The slave synchronous pulse transmitting module is used for transmitting the second synchronous pulse signal.

The slave partial discharge sensor modules are used for receiving the first synchronous pulse signal and the second partial discharge signal.

The slave insulating handles are used for live erecting the slave partial discharge sensor modules and the slave synchronous pulse transmitting module.

The slave communication optical fibers are used for transmitting the first synchronous pulse signal and the second partial discharge signal to the slave detection host.

The slave detection host is used for controlling the slave synchronous pulse transmitting module to transmit the second synchronous pulse signal and sending the first synchronous pulse signal and the second partial discharge signal to the main control computer.

Optionally, both the master detection host and the slave detection host receive a global positioning system (GPS) timing signal based on a clock synchronization instruction and update internal clocks of the master detection unit and the slave detection unit based on the GPS timing signal to realize time calibration of the master detection unit and the slave detection unit.

On the other hand, to achieve the above objective, the disclosure provides a method for live detecting a partial discharge of an overhead line in a distribution network and equipment along the line, including following steps:
acquiring a second synchronous pulse signal and a first partial discharge signal through a master detection unit;
acquiring a first synchronous pulse signal and a second partial discharge signal through a slave detection unit;
analyzing the second synchronous pulse signal and the first synchronous pulse signal through a main control computer to obtain time data, where the time data includes starting time data and receiving time data of the first synchronous pulse signal and the second synchronous pulse signal; and
calculating a propagation time based on the time data, synchronously processing the time data based on the propagation time to obtain reference zeros, and calculating a partial discharge location according to the first partial discharge signal and the second partial discharge signal based on the reference zeros.

Optionally, a calculation process of the propagation time includes:
calculating based on a starting time of the first synchronous pulse signal and a receiving time of the second synchronous pulse signal to obtain a total propagation time, and calculating based on a receiving time of the first synchronous pulse signal and a starting time of the second synchronous pulse signal to obtain an interval time, and
calculating a round trip time based on the total propagation time and the interval time, and calculating the propagation time according to the round trip time.

Optionally, the reference zeros include a first reference zero and a second reference zero, where the first reference zero is the starting time of the first synchronous pulse signal and the second reference zero is a difference between the starting time of the second synchronous pulse signal and the propagation time.

Optionally, a calculation process of the partial discharge location includes:
calculating a master partial signal time interval based on the first reference zero and the starting time of the first partial discharge signal, calculating a slave partial signal time interval based on the second reference zero and the starting time of the second partial discharge signal, calculating a master-slave partial signal time interval based on the master partial signal time interval and the slave partial signal time interval, calculating a distance between the partial discharge location and the master detection unit based on the master-slave partial signal time interval, and obtaining the partial discharge location based on the distance between the partial discharge location and the master detection unit.

Optionally, a process for calculating the master-slave partial signal time interval includes:
calculating a total length of the overhead line based on the propagation time and propagation speeds; and
obtaining the distance between the partial discharge location and the master detection unit based on the master-slave partial signal time interval and the total length of the overhead line, where the propagation speeds are propagation speeds of a first synchronous pulse and a second synchronous pulse on the overhead line.

The disclosure has a technical effect as follows.

The disclosure provides the device and the method for live detecting the partial discharge of the overhead line in the distribution network and equipment along the line. The master detection unit and the slave detection unit receive the GPS timing signal based on the clock calibration instruction, and the main control computer performs the clock synchronization on the master detection unit and the slave detection unit according to the first synchronous pulse signal and the second synchronous pulse signal. A hybrid synchronization mode based on pulse injection and GPS adopted by the disclosure may have a higher synchronization accuracy (<20 ns) than a conventional GPS synchronization mode (<200 ns), thus providing a more accurate partial discharge location result and equipment reliability. According to the disclosure, the partial discharge signals are collected by the master detection unit and the slave detection unit, and are analyzed and first partial discharge information and second partial discharge information are calculated by the main control computer. A double-end location method adopted by the disclosure may effectively avoid location errors or location faults of the partial discharge caused by reflection of the partial discharge at each branch point of the overhead line, thus improving an accuracy of the location result.

BRIEF DESCRIPTION OF THE DRAWINGS

Attached drawings forming a part of this disclosure, are used to provide a further understanding of this disclosure. Illustrative embodiments of this disclosure and their descriptions are used to explain this disclosure and do not constitute an improper limitation of this disclosure. The attached drawings are as follows.

DETAILED DESCRIPTION OF THE EMBODIMENTS

It should be noted that embodiments in this disclosure and features in the embodiments may be combined with each other without conflict. The disclosure is described in detail with reference to attached drawings and embodiments.

The disclosure relates to a method and a device for detecting partial discharge electrification in the overhead line of distribution networks and equipment along that lines.

Figure 1:
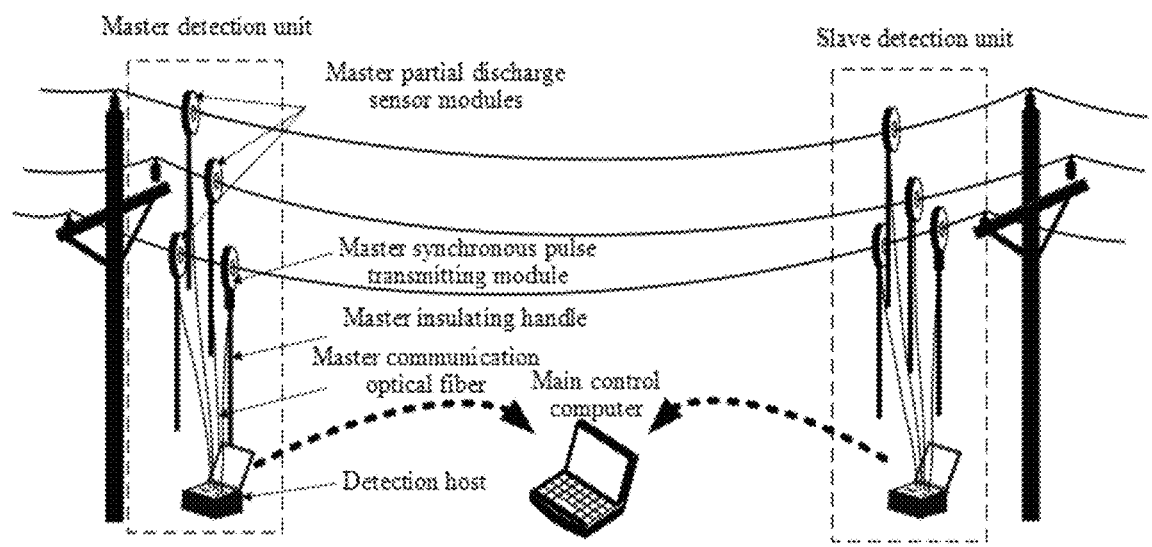
FIG. 1 is a schematic diagram of a system composition in an embodiment of the disclosure.

As shown in FIG. 1, a live detection device for a partial discharge of an overhead line provided by the disclosure mainly consists of two detection units (a master detection unit and a slave detection unit) and a main control computer, and each detection unit mainly consists of five parts: partial discharge sensor modules, a synchronous pulse transmitting module, communication optical fibers, insulating handles and a detection host. High-frequency current transformers are used as inductive coupling sensors for partial discharge, that is, the partial discharge sensor modules. Synchronous pulse signals with amplitudes much higher than partial discharge signals are generated by the synchronous pulse transmitting module, and the module cooperates with a pulses per second (PPS) output of global positioning system (GPS) to realize accurate and reliable clock synchronization of the two detection units. The insulating handles may be used to live installing the partial discharge sensor modules and the synchronous pulse transmitting module on running overhead lines, and partial discharge detection signals are transmitted to the detection host through the optical fibers, thereby realizing reliable isolation of a high-voltage side and a low-voltage side. The detection host mainly includes optical-electrical conversion modules, a synchronous pulse trigger, a data acquisition module, a microprocessor module, a 4G communication module and a GPS module for mainly completing functions of synchronization, data acquisition, analysis and uploading. A function of the main control computer is to control the two detection units to carry out partial discharge detection, and collect data of the partial discharge detection of the two detection units to evaluate an intensity and a partial discharge location.

Figure 2:
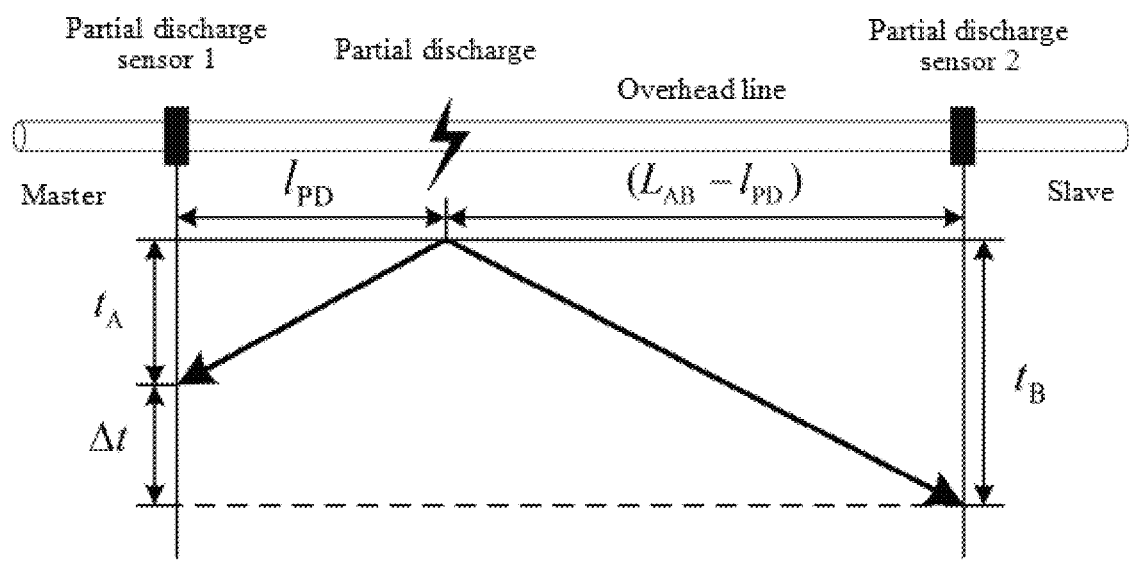
FIG. 2 is a schematic diagram of double-end location in an embodiment of the disclosure.

According to the disclosure, a double-end traveling wave method is adopted to accurately locate a partial discharge on an overhead line. When the partial discharge appears on the overhead line or equipment along the line, the partial discharge may be coupled to a conductor of the overhead line and propagate to both ends along the overhead line (a partial discharge signal propagated to the master detection unit is named as first partial discharge information, and a partial discharge signal propagated to the slave detection unit is named as second partial discharge information). Therefore, synchronized detection units are installed at both ends of the overhead line (named master and slave respectively), and a location of a partial discharge source may be located by calculating a time difference when a partial discharge signal reaches the two detection units. A basic principle is shown in FIG. 2, and a partial discharge location from the master may be calculated by a following formula:

$$l_{PD} = \frac{L_{AB} + (t_A - t_B) \cdot v}{2}, \qquad (1)$$

where $l_{PD}$ is a distance between a partial discharge location and the master detection unit, $L_{AB}$ is a length of an overhead line to be detected, $t_A$ is a time taken for the partial discharge signal arriving the master detection unit, $t_B$ is a time taken for the partial discharge signal reaches the slave detection unit, and v is a propagation speed of the partial discharge signal on the overhead line. This double-end traveling wave location method has an advantage of high location precision and is not affected by reflected waves of each branch node of the overhead line.

Figure 3:
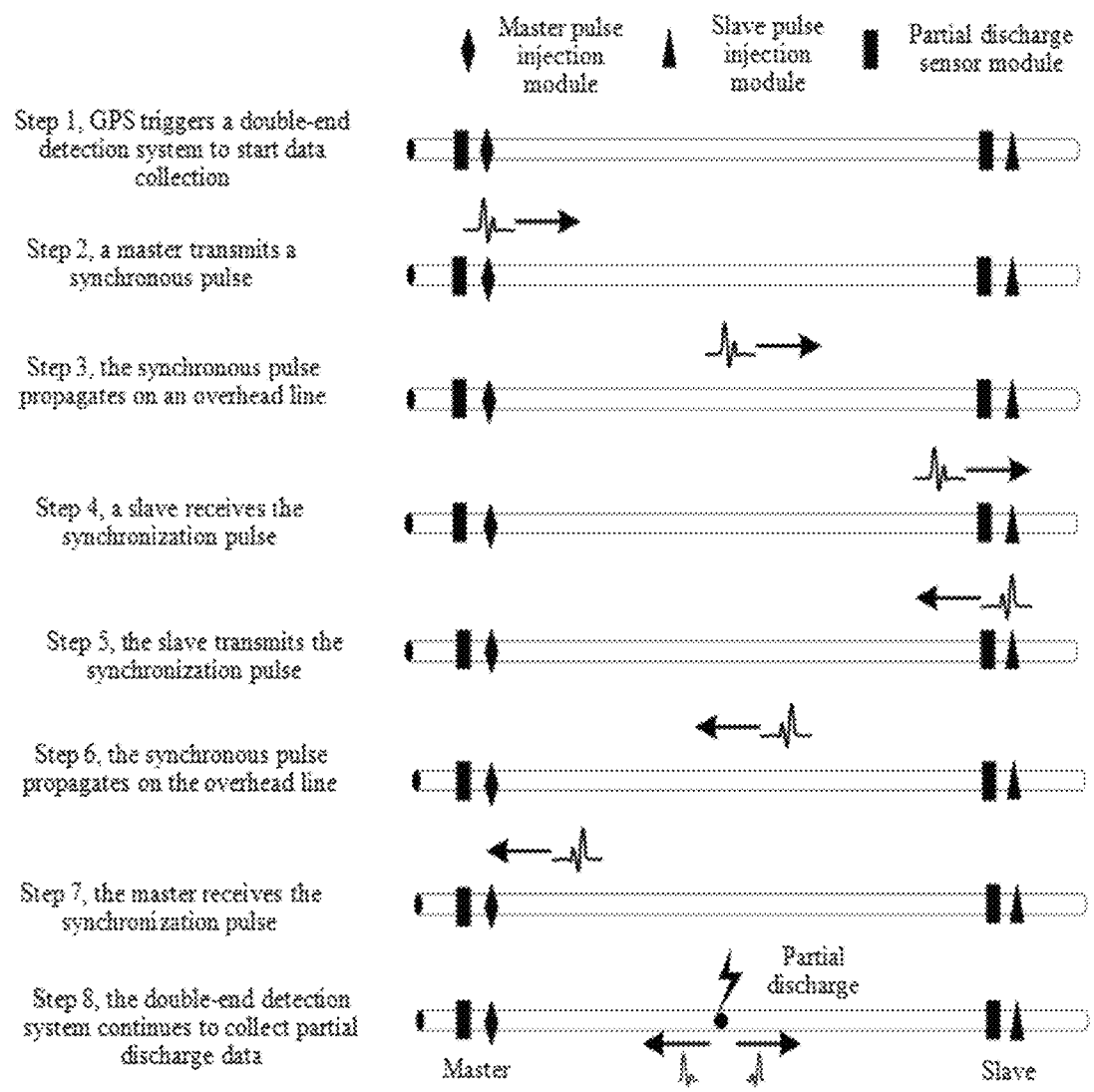
FIG. 3 is a schematic diagram of pulse injection and GPS hybrid synchronization in an embodiment of the disclosure.

For a double-end location method, one of key technologies is how to realize the clock synchronization of a double-end detection system. The disclosure proposes to adopt a hybrid synchronization mode of pulse injection and GPS. The double-end detection system is triggered by the GPS for data collection, and then the GPS is calibrated by injecting pulse signals, to realize reliable and accurate clock synchronization of the double-end system. A basic workflow is described as follows (with reference to FIG. 3 and FIG. 4).

Step 1, a main control computer sends a clock calibration instruction, and a master detection unit and a slave detection unit receive a GPS timing signal according to the instruction, and internal clocks of the master detection unit and the slave detection unit are updated according to the signal to complete clock calibration. At this time, a clock error between the master detection unit and the slave detection unit is less than 200 μs. The clock calibration instruction also contains time point information (for example, 12:00:00). According to this time point information, the two detection units open a time window of 100 μs at this time point to enable pulse synchronization.

Step 2, a synchronous pulse, that is, a first synchronous pulse signal is transmitted by a synchronous trigger controlled by a microprocessor of the master detection unit, and is coupled to an overhead line.

Step 3, the first synchronous pulse signal transmitted by the master detection unit propagates along the overhead line to the slave.

Step 4, a partial discharge sensor module of the slave detection unit detects this pulse and triggers a synchronous pulse trigger in a slave detection host.

Step 5, another synchronous pulse, that is, a second synchronous pulse signal is transmitted by a synchronous pulse transmitter triggered by a slave synchronous pulse trigger, and is coupled to the overhead line.

Step 6, the second synchronous pulse signal transmitted from the slave detection unit propagates to the master detection unit along the overhead line.

Step 7, a partial discharge sensor module of the master detection unit detects the second synchronous pulse signal transmitted from the slave detection unit.

Step 8, after the 100 μs time window is over, two detection hosts collect partial discharge data.

Figure 4:
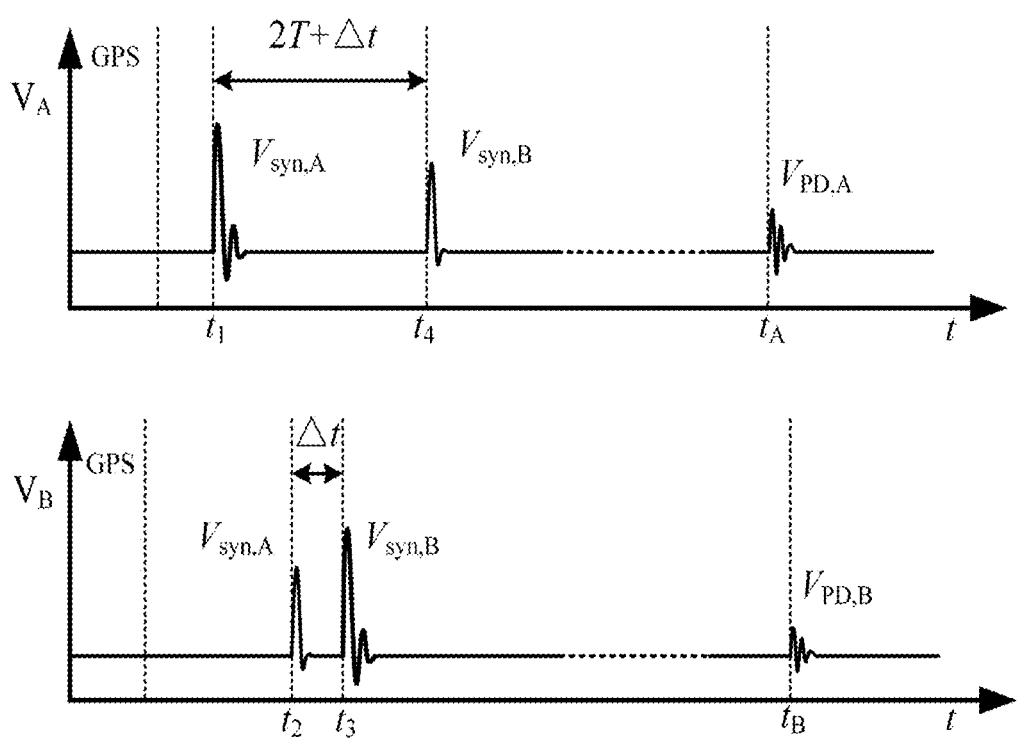
FIG. 4 is a schematic diagram of a double-end detection waveform based on pulse injection and GPS hybrid synchronization in an embodiment of the disclosure.

Through the above pulse synchronization process, a propagation time T of a high-frequency pulse signal on the detected overhead line may be obtained according to signal data collected by the detection units at two ends (as shown in FIG. 4), and a calculation formula is as follows:

$$T = \frac{(t_4 - t_1) - (t_3 - t_2)}{2}, \quad (2)$$

where $t_1$ is a transmission time, namely a starting time of a first pulse signal, $t_2$ is a time of receiving the first pulse signal from the slave detection unit, namely a receiving time, $t_3$ is a starting time of a second pulse signal, and $t_4$ is a receiving time of the second pulse signal.

The starting time of the first synchronous pulse transmitted by the master detection unit is defined as a reference time zero ($t_1$), that is, a first reference zero, and then a reference zero of partial discharge signal data collected from the slave detection unit may be calculated as ($t_2-T$), that is, a second reference zero, so detection data of the detection units at two ends are accurately synchronized. With reference to a formula (1), the partial discharge location may be calculated as follows:

$$l_{PD} = \frac{L_{AB} + v \cdot [(t_A - t_1) - (t_B - t_2 + T)]}{2}, \quad (3)$$

where $l_{PD}$ is a distance between the partial discharge location and the master detection unit, $L_{AB}$ is a total length of the overhead line, to is the time taken for the partial discharge signal to reach the master detection unit, and $t_B$ is the time taken for the partial discharge signal to reach the slave detection unit.

The total length $L_{AB}$ of the overhead line may be calculated by a following formula:

$$L_{AB} = T \cdot v = [(t_4 - t_1) - (t_3 - t_2)] \cdot v \quad (4),$$

where T is a propagation time of the first synchronous pulse signal from the master to the slave, and v is a propagation speed of the first synchronous pulse signal.

When length information of the detected overhead line is lacking, estimating the length of the detected overhead line by the synchronous pulse may provide a great convenience for an on-site partial discharge location application and provide more accurate partial discharge location results.

Figure 5:
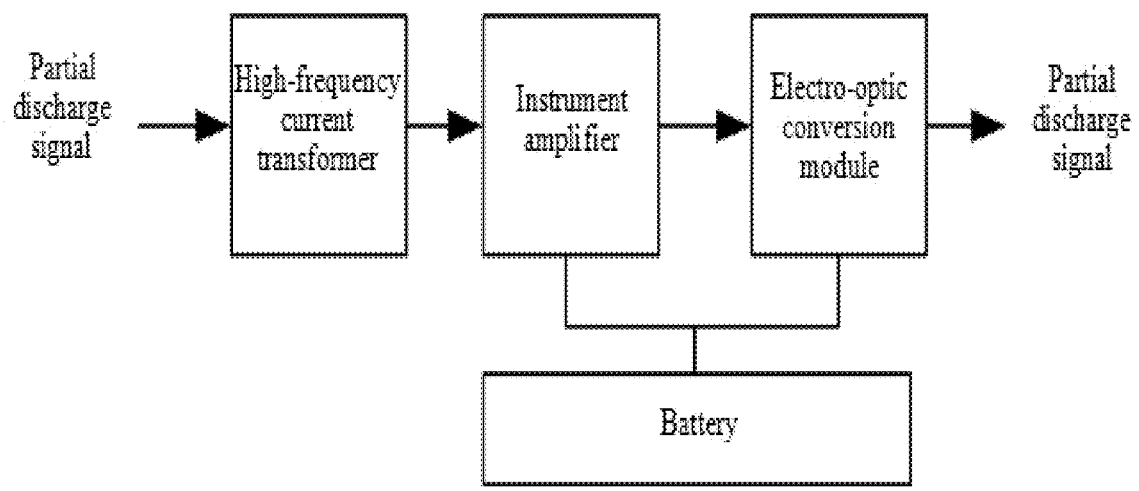
FIG. 5 is a schematic diagram of a partial discharge sensor module in an embodiment of the disclosure.
Figure 6:
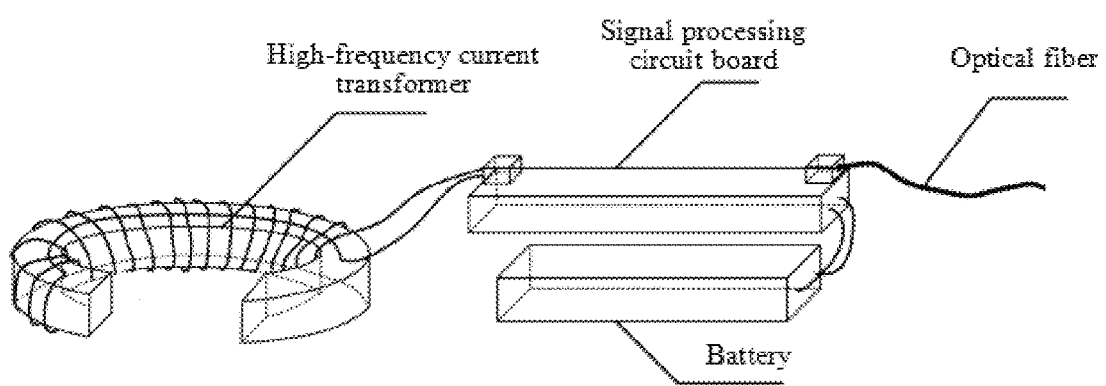
FIG. 6 is a schematic diagram of an internal structure of a partial discharge sensor module in an embodiment of the disclosure.

As shown in FIG. 5 and FIG. 6, each detection unit contains three identical partial discharge sensor modules (by inductive coupling) used to detect partial discharges of three-phase lines of an overhead line respectively. Each of the partial discharge sensor modules is composed of a high-frequency current transformer, an instrument amplifier, an electro-optic converter, and a battery. The high-frequency current transformer has a sensitivity of 5 mV/mA and a bandwidth of 200 kHz-60 MHz, the instrument amplifier has a magnification of 4 times and a bandwidth of not less than 100 kHz-100 MHz, and the electro-optic converter has a bandwidth of not less than DC-125 MHz, and an 8.4 V lithium battery is used for the battery.

Figure 7:
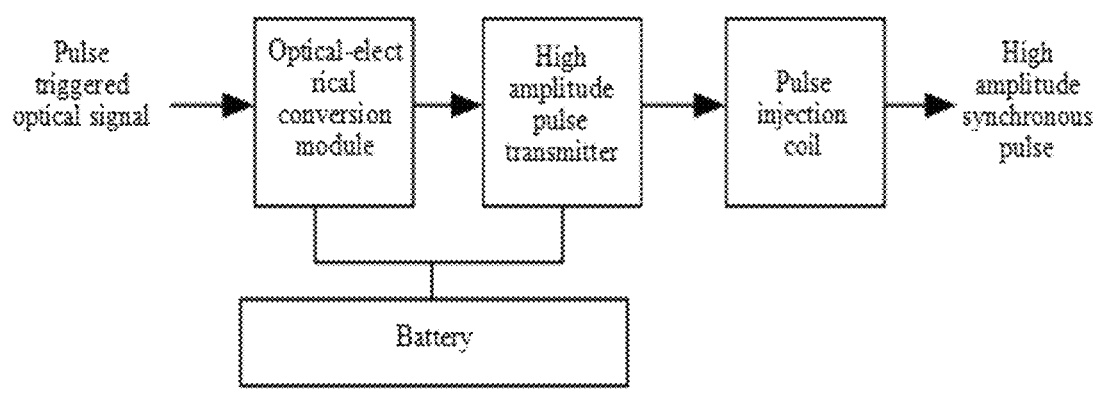
FIG. 7 is a schematic diagram of a synchronous pulse transmitting module in an embodiment of the disclosure.
Figure 8:
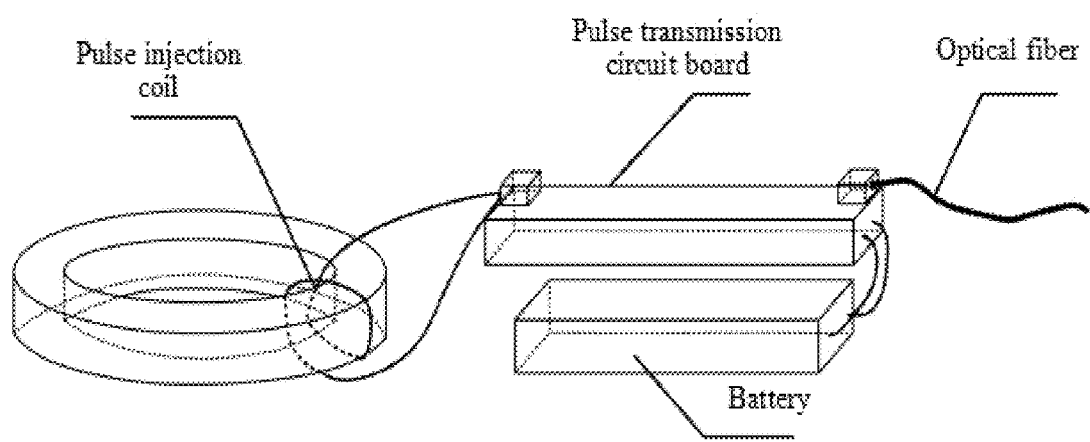
FIG. 8 is a schematic diagram of an internal structure of a synchronous pulse transmitting module in an embodiment of the disclosure.

As shown in FIG. 7 and FIG. 8, the synchronous pulse transmitting module is mainly composed of a pulse injection coil, a pulse transmitter, an optical-electrical converter, and a battery. The pulse injection coil is made of a material with a magnetic permeability of not less than 2000, and a number of turns is not more than 10. The pulse transmitter may generate a pulse signal with an amplitude of not less than 50 V and a pulse width of not less than 200 ns. A bandwidth of the electro-optic converter is not less than DC-125 MHz, and the battery is an 8.4 V lithium battery.

Figure 9:
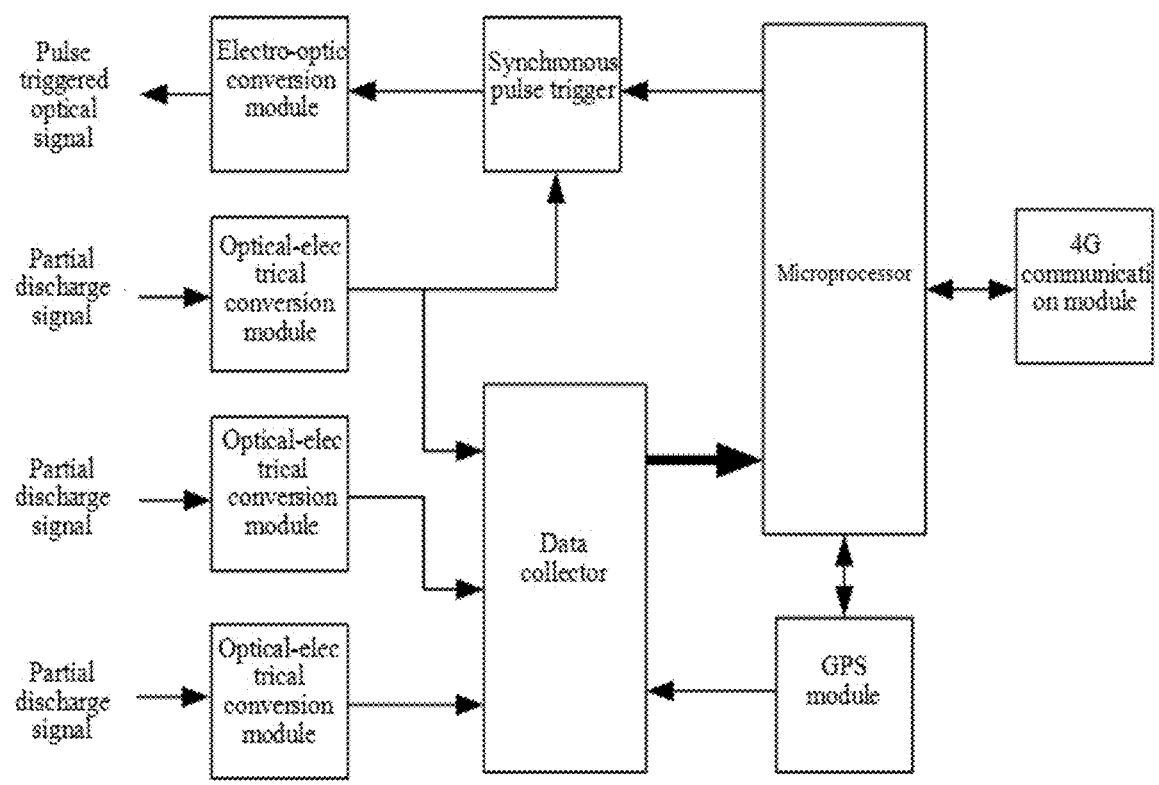
FIG. 9 is a schematic diagram of an internal structure of a detection host in an embodiment of the disclosure.

As shown in FIG. 9, each detection host is mainly composed of optical-electrical (electro-optical) conversion modules, a synchronous pulse trigger, a data acquisition module, a microprocessor module, a 4G communication module, and a GPS module. A bandwidth of each of the optical-electrical (electro-optical) conversion modules is not less than DC-125 MHz. The synchronous pulse trigger adopts a threshold trigger principle and may be triggered passively by a high-amplitude synchronous pulse or actively by the microprocessor. The data acquisition module has a sampling rate of no less than 50 MS/s and a sampling number of no less than 8 bits. The microprocessor module adopts an FPGA+ARM architecture and has a parallel processing capacity of greater than 1 Gbyte. The GPS module may output time stamps in real time through a serial port and has a PPS pulse output function. It should be noted that because a three-phase overhead line has an almost symmetrical structure and data of partial discharge sensors of the three-phase overhead line are collected by a data collector at the same time, only one synchronous transmitter is needed in each detection unit.

Figure 10:
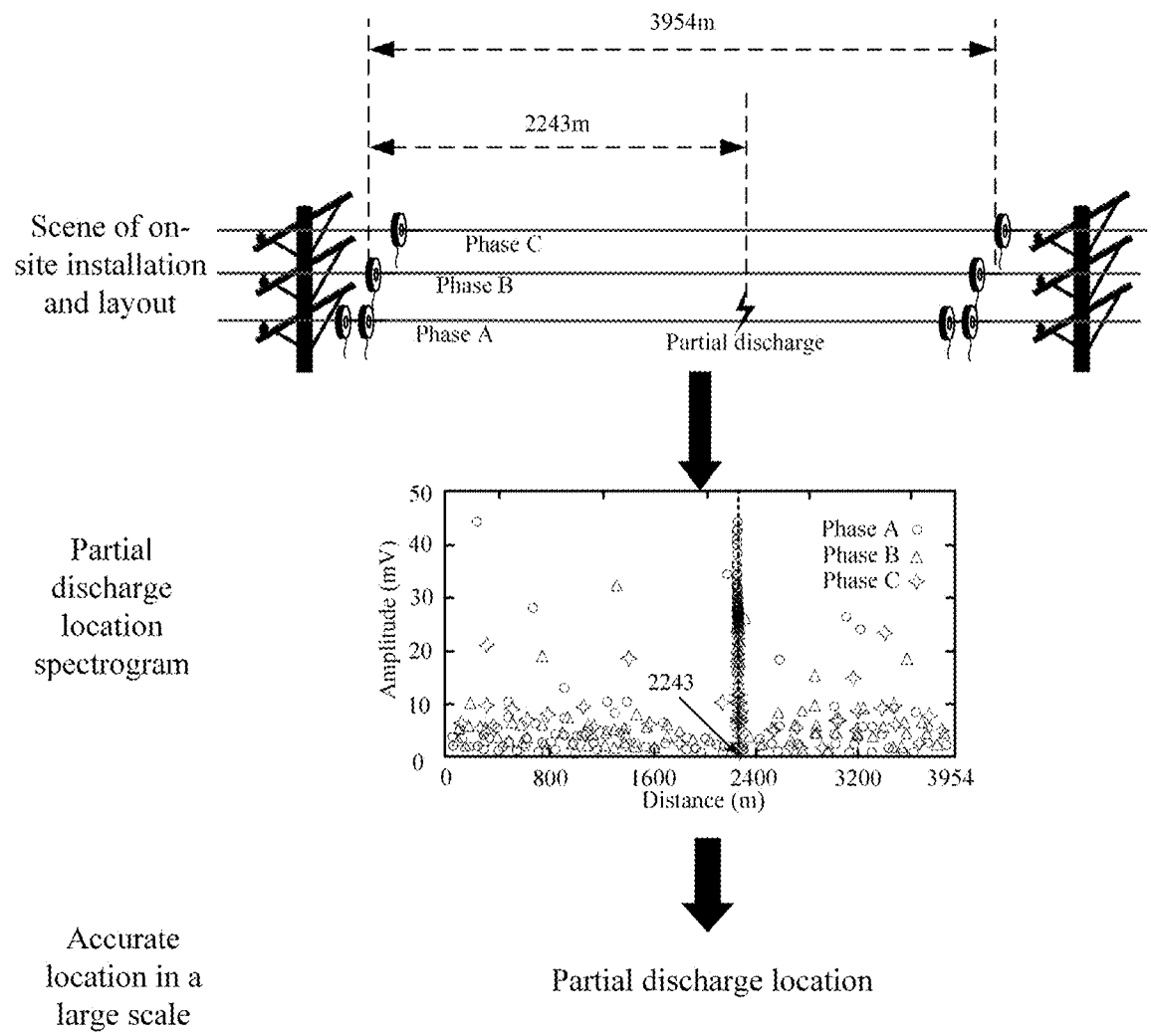
FIG. 10 is a schematic diagram of a system detection and location concept in an embodiment of the disclosure.

The detection device according to the disclosure may be installed by climbing an electric pole and riding an insulated steep-arm vehicle, may be safely installed and arranged on an overhead line running with electricity, and meets requirements of a live operation. A schematic diagram of an application effect of the detection method and the device is shown in FIG. 10. According to the detection method and the device, a partial discharge detection of several kilometers of overhead line and equipment along the line may be carried out, and a specific partial discharge location may be accurately located, an efficiency of defect finding is significantly improved, and a clear guidance for operation and maintenance of the overhead line is provided.

Figure 11:
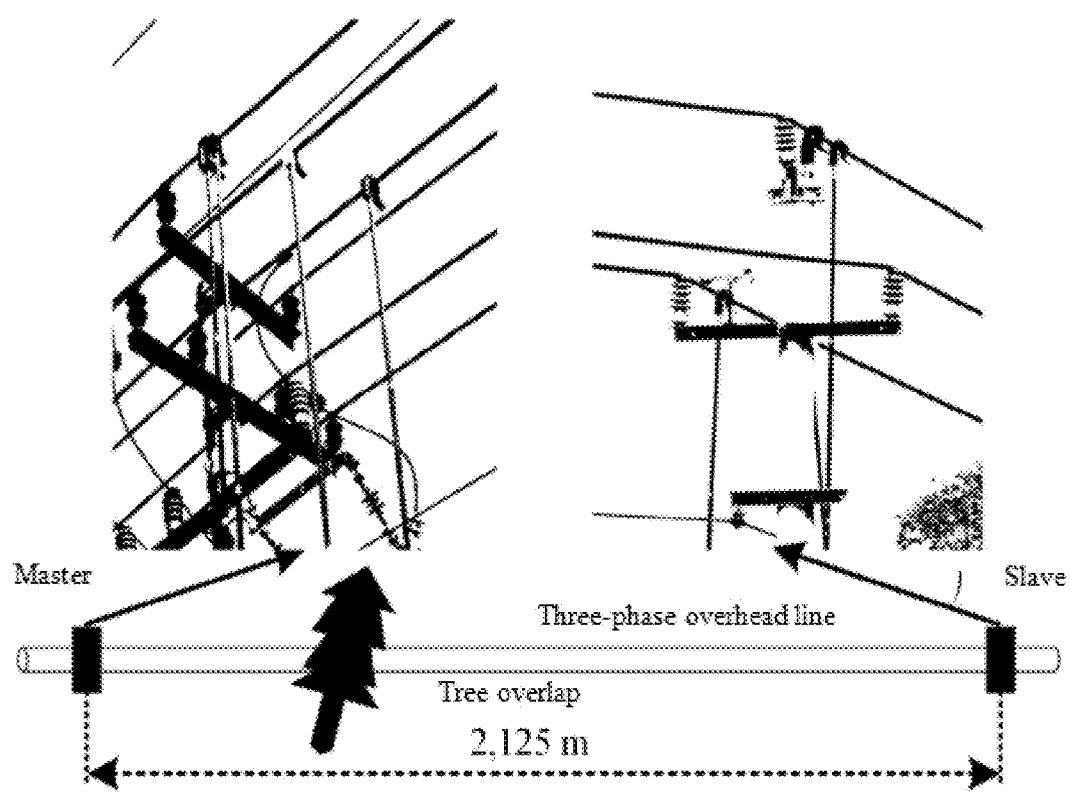
FIG. 11 is a schematic diagram of field arrangement in an embodiment of the disclosure.
Figure 12:
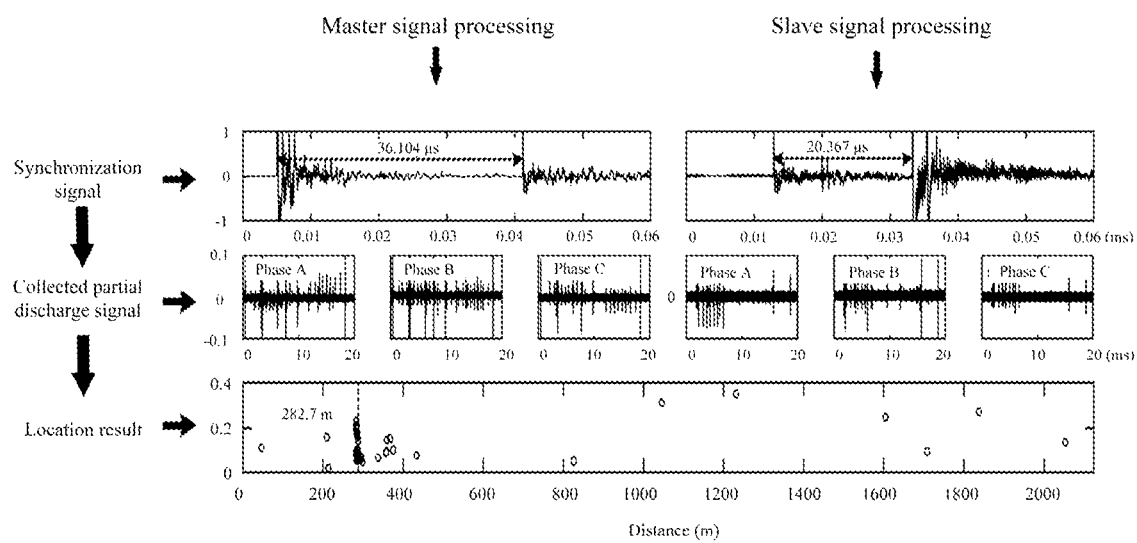
FIG. 12 is a schematic diagram of detection results in an embodiment of the disclosure.
Figure 13:
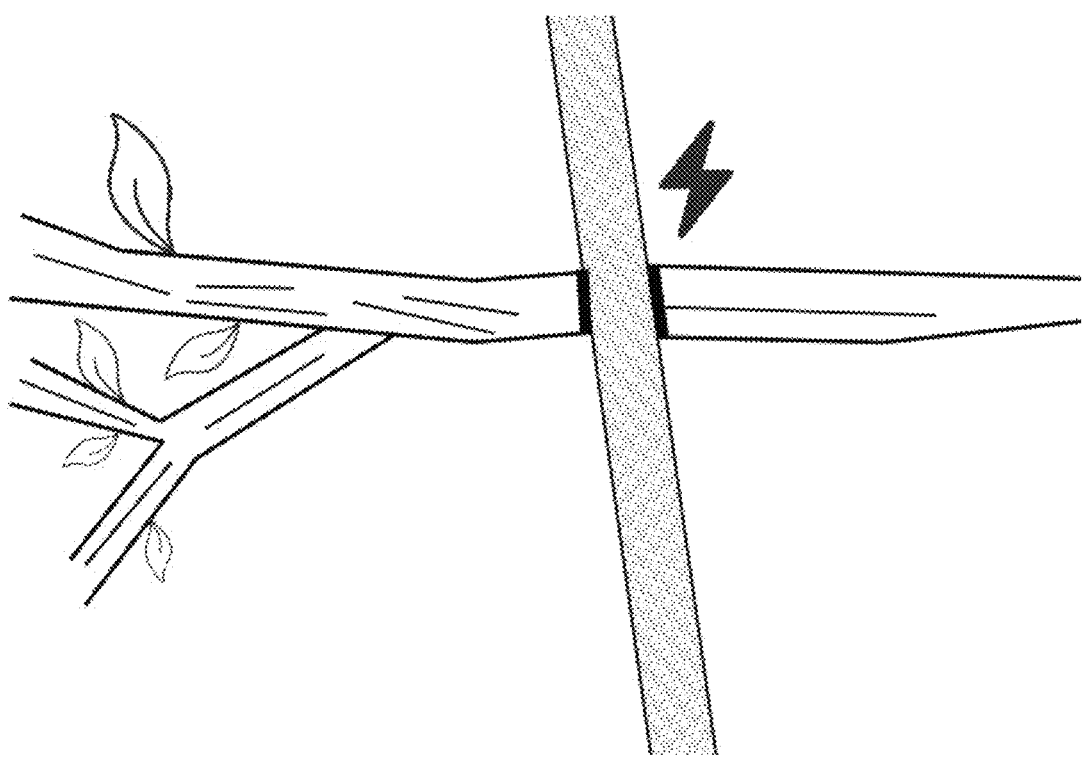
FIG. 13 is a defect physical diagram in an embodiment of the disclosure.

According to the disclosure, there is an application case in a real 2125 m long three-phase overhead line. FIG. 11 shows an arrangement of the device according to the disclosure on the overhead line to be detected. Two detection units (master and slave) are respectively installed at both ends of the overhead line, three-phase partial discharge sensors of red, yellow, and green are respectively installed on the three-phase overhead line, and a synchronous sensor is installed on a middle phase of the overhead line. Detection results are shown in FIG. 12. The double-end detection system may accurately detect synchronous pulses and partial discharge signals, proving a feasibility of a proposed synchronization mode and effectiveness of a sensing mode. According to a time difference between the synchronous pulses (with reference to a formula 2), the propagation time of the synchronous pulses from the master to the slave is calculated as 7.864 ns. Synchronization of the detection units at both ends is completed. A location result shows that there is an obvious partial discharge at a distance of 282.7 m from the master. A whole test process is completed in 20 minutes, and the process is significantly improved compared with traditional inspection based on vision or ultrasound (about several hours). Finally, to confirm a specific type of partial discharge, an inspection was carried out near the location result, and it was found that there was an obvious branch overlap defect at a location about 280 m away from the master, as shown in FIG. 13. If the defect was not handled in time, the defect was likely to develop into a ground fault and lead to a power outage accident. Therefore, operation and maintenance personnel of a power grid immediately pruned branches at this place, re-measured with the device according to the disclosure, and found that a partial discharge signal disappeared, confirming that the device according to the disclosure detected the defect at this place. The above-mentioned field case proves the effectiveness of the method and device according to the disclosure.

The above is only a preferred embodiment of this disclosure, but a protection scope of this disclosure is not limited to this. Any change or replacement that may be easily thought of by a person familiar with this technical field within a technical scope disclosed in this disclosure should be covered by this disclosure. Therefore, the protection scope of this disclosure should be based on the protection scope of the claims.

What is claimed is:

1. A device for live detecting a partial discharge of an overhead line in a distribution network and equipment along the line, comprising:
   a master detection unit, a slave detection unit, and a main control computer, wherein the master detection unit and the slave detection unit are respectively connected with the main control computer;
   wherein the master detection unit comprises:
   a master synchronous pulse transmitting module, master partial discharge sensor modules, master insulating handles, master communication optical fibers, and a master detection host; the master synchronous pulse transmitting module and the master partial discharge sensor modules are respectively connected with the master detection host through the master communication optical fibers; the master insulating handles are connected with the master synchronous pulse transmitting module and the master partial discharge sensor modules for live erecting the master synchronous pulse transmitting module and the master partial discharge sensor modules on the overhead line;
   wherein the slave detection unit comprises:
   a slave synchronous pulse transmitting module, slave partial discharge sensor modules, slave insulating handles, slave communication optical fibers, and a slave detection host; the slave synchronous pulse transmitting module and the slave partial discharge sensor modules are respectively connected with the slave detection host through the slave communication optical fibers; the slave insulating handles are connected with the slave synchronous pulse transmitting module and the slave partial discharge sensor modules for live erecting the slave synchronous pulse transmitting module and the slave partial discharge sensor modules on the overhead line;
   wherein the main control computer sends a clock calibration instruction, and the master detection unit and the slave detection unit receive a global positioning system (GPS) timing signal according to the instruction, and internal clocks of the master detection unit and the slave detection unit are updated according to the signal to complete clock calibration;
   a first synchronous pulse signal is transmitted by the synchronous trigger controlled by a microprocessor of the master detection unit, and is coupled to an overhead line;
   the first synchronous pulse signal transmitted by the master detection unit propagates along the overhead line to the slave;
   a partial discharge sensor module of the slave detection unit detects this pulse and triggers a synchronous pulse trigger in the slave detection host;
   a second synchronous pulse signal is transmitted by a synchronous pulse transmitter triggered by a slave synchronous pulse trigger, and is coupled to the overhead line,
   the second synchronous pulse signal transmitted from the slave detection unit propagates to the master detection unit along the overhead line,
   a partial discharge sensor module of the master detection unit detects the second synchronous pulse signal transmitted from the slave detection unit;
   the slave detection host and the main detection host collect partial discharge data;
   a propagation time T of a high-frequency pulse signal on the detected overhead line is obtained according to signal data collected by the master detection unit and the slave detection unit at two ends, and a calculation formula is as follows:

$$T = \frac{(t_4 - t_1) - (t_3 - t_2)}{2}, \quad (1)$$

where $t_1$ is a transmission time, namely a starting time of the first pulse signal, $t_2$ is a time of receiving the first pulse signal from the slave detection unit, namely a receiving time, $t_3$ is a starting time of the second pulse signal, and $t_4$ is a receiving time of the second pulse signal;

the starting time of the first synchronous pulse transmitted by the master detection unit is defined as a first reference zero $t_1$, and a reference zero of partial discharge signal data collected from the slave detection unit is calculated as a second reference zero ($t_2-T$), so detection data of the detection units at two ends are accurately synchronized, the partial discharge location is calculated as follows:

$$I_{PD} = \frac{L_{AB} + v \cdot [(t_A - t_1) - (t_B - t_2 + T)]}{2}, \quad (2)$$

where $I_{PD}$ is a distance between the partial discharge location and the master detection unit, $L_{AB}$ is a total length of the overhead line, $t_A$ is a time taken for the partial discharge signal to reach the master detection unit, and $t_B$ is a time taken for the partial discharge signal to reach the slave detection unit;

a total length $L_{AB}$ of the overhead line is calculated by a following formula:

$$L_{AB} = T \cdot v = [(t_4 - t_1) - (t_3 - t_2)] \cdot v, \quad (3)$$

where T is a propagation time of the first synchronous pulse signal from the master to the slave, and v is a propagation speed of the first synchronous pulse signal;

where the main control computer calculates a partial discharge location according to the first partial discharge information and the second partial discharge information based on a clock synchronization result.

2. A method for live detecting a partial discharge of an overhead line in a distribution network and equipment along the line, applied to the device for live detecting a partial discharge of an overhead line in a distribution network and equipment along the line according to claim 1, comprising following steps:

acquiring a second synchronous pulse signal and a first partial discharge signal through a master detection unit;

acquiring a first synchronous pulse signal and a second partial discharge signal through a slave detection unit;

analyzing the second synchronous pulse signal and the first synchronous pulse signal through a main control computer to obtain time data, wherein the time data comprises starting time data and receiving time data of the first synchronous pulse signal and the second synchronous pulse signal; and calculating a propagation time based on the time data, synchronously processing the time data based on the propagation time to obtain reference zeros, and calculating a partial discharge location according to the first partial discharge signal and the second partial discharge signal based on the reference zeros.

3. The method for live detecting the partial discharge of the overhead line in the distribution network and equipment along the line according to claim 2, wherein, a calculation process of the propagation time comprises:

calculating based on a starting time of the first synchronous pulse signal and a receiving time of the second synchronous pulse signal to obtain a total propagation time, and calculating based on a receiving time of the first synchronous pulse signal and a starting time of the second synchronous pulse signal to obtain an interval time, and calculating a round trip time based on the total propagation time and the interval time, and calculating the propagation time according to the round trip time.

4. The method for live detecting the partial discharge of the overhead line in the distribution network and equipment along the line according to claim 2, wherein, the reference zeros comprise a first reference zero and a second reference zero, wherein the first reference zero is the starting time of the first synchronous pulse signal and the second reference zero is a difference between the starting time of the second synchronous pulse signal and the propagation time.

5. The method for live detecting the partial discharge of the overhead line in the distribution network and equipment along the line according to claim 2, wherein a calculation process of the partial discharge location comprises:

calculating a master partial signal time interval based on the first reference zero and the starting time of the first partial discharge signal, calculating a slave partial signal time interval based on the second reference zero and the starting time of the second partial discharge signal, calculating a master-slave partial signal time interval based on the master partial signal time interval and the slave partial signal time interval, calculating a distance between the partial discharge location and the master detection unit based on the master-slave partial signal time interval, and obtaining the partial discharge location based on the distance between the partial discharge location and the master detection unit.

6. The method for live detecting the partial discharge of the overhead line in the distribution network and equipment along the line according to claim 5, wherein a process for calculating the master-slave partial signal time interval comprises:

calculating a total length of the overhead line based on the propagation time and propagation speeds; and obtaining the distance between the partial discharge location and the master detection unit based on the master-slave partial signal time interval and the total length of the overhead line, wherein the propagation speeds are propagation speeds of a first synchronous pulse and a second synchronous pulse on the overhead line.

* * * * *